US006149356A

United States Patent [19]

Chu et al.

[11] Patent Number: 6,149,356

[45] Date of Patent: Nov. 21, 2000

[54] PORTABLE PNEUMATIC TOOL ASSEMBLED WITH MODULE UNITS

[75] Inventors: George Chu, Taoyuan; Chien-Chung Chuang, Yung-Ho, both of Taiwan

[73] Assignee: China Pneumatic Corporation, Taoyuan, Taiwan

[21] Appl. No.: 09/293,531

[22] Filed: Apr. 15, 1999

[51] Int. Cl.[7] ...................................................... B23B 51/06

[52] U.S. Cl. ................................ 408/56; 81/465; 81/466; 173/169; 173/170; 173/212; 227/130; 408/124

[58] Field of Search ..................... 408/56, 124; 173/168, 173/169, 170, 210, 212; 81/465, 466; 227/130

[56] References Cited

U.S. PATENT DOCUMENTS

| | | | |
|---|---|---|---|
| 3,433,082 | 3/1969 | Bitter et al. | 408/124 |
| 4,091,981 | 5/1978 | Moriguchi et al. | 227/8 |
| 4,292,571 | 9/1981 | Cuneo | 408/124 |
| 4,316,512 | 2/1982 | Kibblewhite et al. | 173/12 |
| 4,327,807 | 5/1982 | Emonet | 173/134 |
| 5,533,579 | 7/1996 | Chu | 173/17 |
| 5,904,453 | 5/1999 | Gavia | 408/124 |
| 5,951,217 | 9/1999 | Ostermeier et al. | 408/124 |
| 5,954,457 | 9/1999 | Stock et al. | 408/124 |

*Primary Examiner*—A. L. Wellington
*Assistant Examiner*—Monica S. Carter

[57] ABSTRACT

A portable pneumatic tool includes a housing composed of two symmetric half shells or several partially cut-away shells; an air inlet module unit, a valve actuating module unit and an operating (or functioning) module unit fluidically communicated with one another and connected with flexible hoses among the module units; and a shock-absorbing unit retained between the operating module unit and the housing; whereby upon embedding or fixation of all the module units into the corresponding cavities in the shells and upon combination of the shells, a portable pneumatic tool will be instantly obtained having advantages of light weight, shock-absorbable property, easy assembly, lower production cost and convenient maintenance.

4 Claims, 16 Drawing Sheets

PORTABLE PNEUMATIC TOOL ASSEMBLED WITH MODULE UNITS

BACKGROUND OF THE INVENTION

A conventional pneumatic tool includes a housing which may be made by casting processes. The housing should be further treated by mechanical processing for machining air passages in the housing. The relevant elements including the air cylinder, valve means, air-inlet adapter, etc. are then implemented into the housing for assembling a portable pneumatic tool.

In a conventional air tool, there are complex air passages A formed in the housing S as shown in FIG. 19, and cores should be provided in the casting mold during the casting process in order to form the air passages A, thereby increasing the production complexity and cost. Meanwhile, the casting product may contain fine apertures in the tool housing with porosity, thereby causing problem of air leakage and deteriorating the product quality of the pneumatic tool.

Meanwhile, it is usually difficult to assemble a shock-absorbing device in the housing of the pneumatic tool. If the housing of the tool is made by casting of metallic material, the tool will be heavy, inconvenient for handling and operation.

The present inventor has found the drawbacks of the conventional pneumatic tool, and invented the present pneumatic tool assembled with module units.

SUMMARY OF THE INVENTION

The object of the present invention is to provide a portable pneumatic tool including a housing composed of two symmetric half shells or partially cut-away shells; an air inlet module unit, a valve actuating module unit and an operating (or functioning) module unit fluidically communicated with one another and connected with flexible hoses among the module units; and a shock-absorbing unit retained between the operating (or functioning) module unit and the housing; whereby upon embedding or fixation of all the module units into the corresponding cavities in the shells and upon combination of the shells, a portable pneumatic tool will be instantly obtained having advantages of light weight, shock-absorbable property, easy assembly, lower production cost and convenient maintenance.

DETAILED DESCRIPTION

Figure 1:
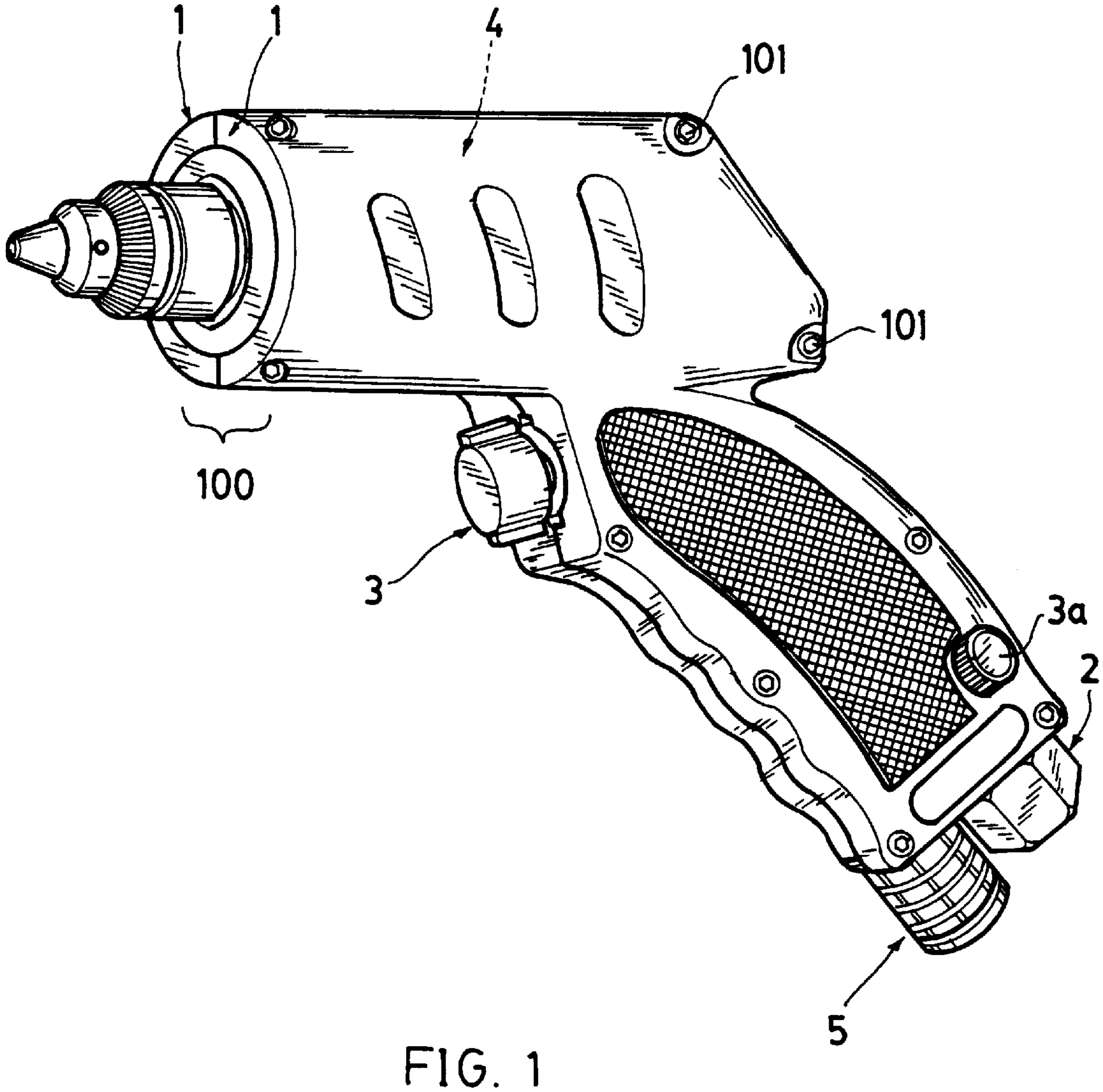
FIG. 1 is a perspective view of an air drill as made in accordance with the present invention.
Figure 2:
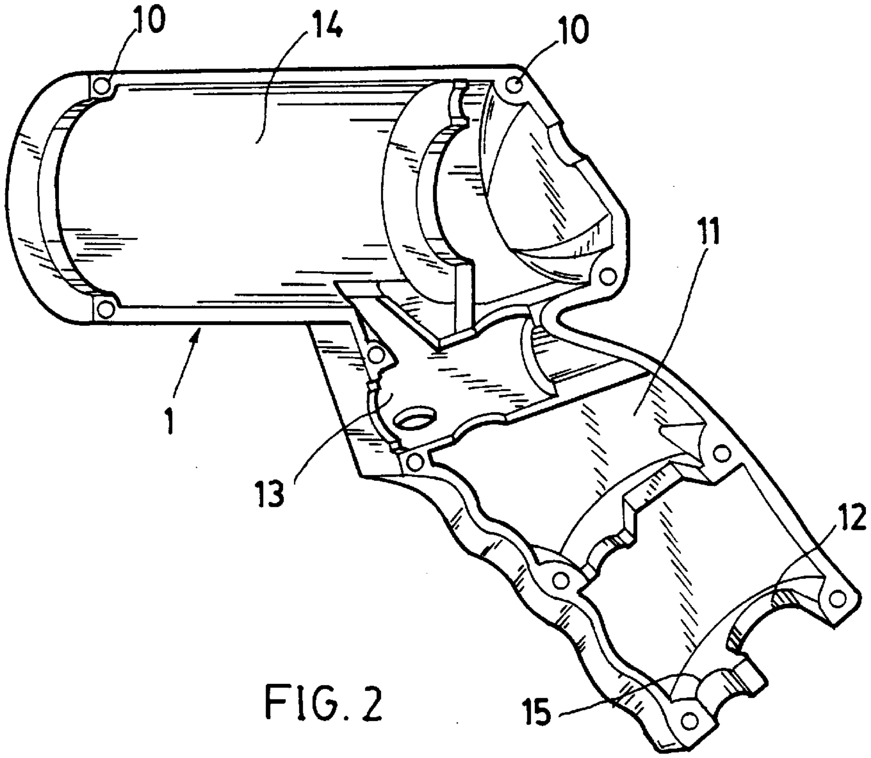
FIG. 2 shows a half shell of the housing of the air drill as shown in FIG. 1.
Figure 3:
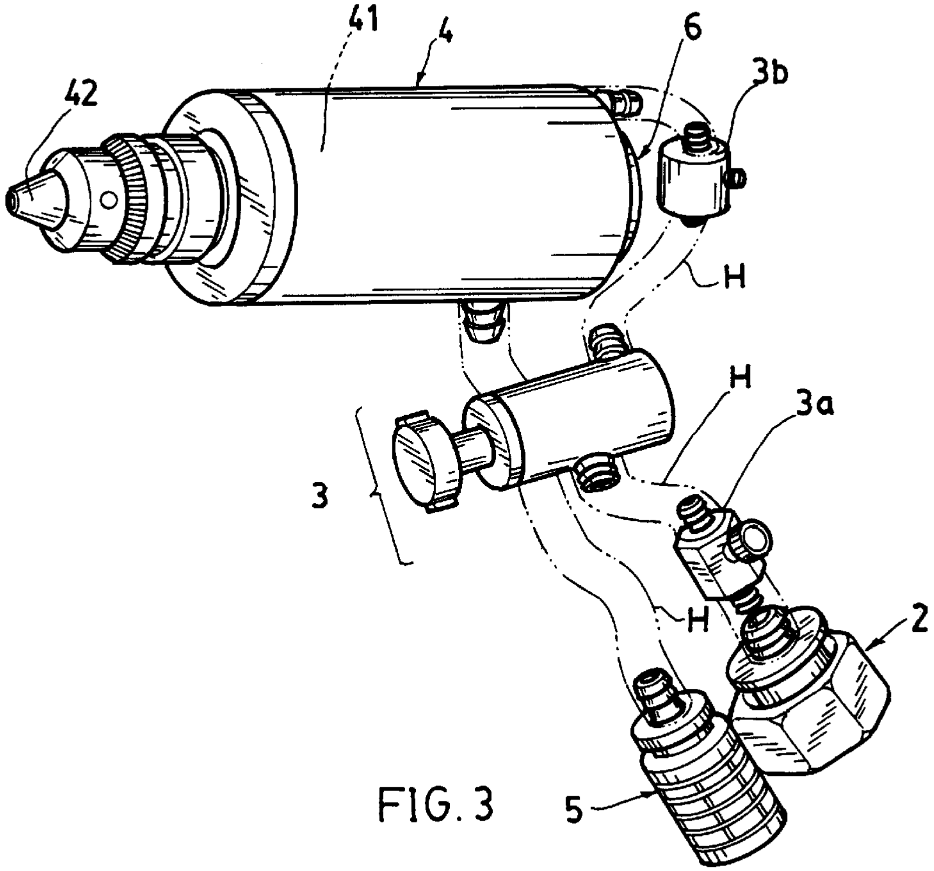
FIG. 3 is an exploded view showing the module units connected with flexible air hoses to be assembled in the housing of the air drill.

As shown in FIGS. 1–3, an air drill of the present invention comprises: a housing 100 composed of two symmetric half shells or partically cut-away shells 1; an air inlet module unit 2 for leading air into the housing and secured in an air-inlet cavity 12 recessed in a grip 11 of the shell 1; a valve actuating module unit 3 secured in a valve cavity 13 recessed in the grip 11 of the shell 1; an operating or functioning module unit 4 having an air motor 41 and a drill (chuck) 42 driven by the air motor protruding forwardly beyond the shell 1 for drilling purpose, with the operating or functioning unit 4 embedded in the functioning cavity 14 recessed in the shell 1 and controlled by the valve actuating module unit 3; and an air outlet module unit 5 including an air exhaust muffler secured in an air outlet cavity 15 recessed in the grip 11 for discharging exhaust air outwardly; the two half shells (or partially cut-away shells) 1, 1 combinable by fixing bolts or screws 101 through the bolt (or screw) holes 10 formed in each shell 1.

All the module units are fluidically communicated with one another and are respectively connected with flexible air hoses H between every two neighboring units, for instance, a hose H connected between the air inlet module unit 2 and the valve actuating module unit 3 having a regulator 3*a* mounted in the hose H for adjusting inlet air flow rate or air pressure; and another air hose H connected between the valve unit 3 and the operating or functioning unit 4 having a lubricator 3*b* mounted in the hose H for lubricating purpose as shown in FIG. 3.

The half shell 1 may be made of plastic or engineering plastic materials by injection molding. Any other materials having light weight and suitable mechanical properties adapted for manufacturing processes may also be used for making the shell 1 of the present invention. For instance, light titanium or aluminum alloy, light composites or other materials.

A shock-absorbing unit or damping unit 6 is provided in between the operating or functioning unit 4 and the housing 100 for absorbing vibrational shock during the operation of the pneumatic tool. The shock-absorbing unit 6 may be a damping spring or a shock-absorbable elastomer media packed between the operating or functioning unit 4 and the inside wall of the shells 1, 1 of the housing 100.

After fitting the module units in the corresponding cavities formed in the shell 1, the shells are then combined and fastened by screw or bolts 101 or other fastening methods to form an air drill as illustrated in FIG. 1.

Accordingly, this invention is superior to a conventional pneumatic tool of which the housing is fabricated by casting and maching process with the following advantages:

1. All the module units are assembled in the shells, and the two half (or partially cut-away) shells are then combined and fastened to be a pneumatic tool, thereby simplifying the production and decreasing the cost for the pneumatic tools.
2. The heavy casting metallic material for making the housing of conventional pneumatic tool is now substituted with lighter material of the present invention. So, an air tool with light weight and easy carrying can be obtained in accordance with the present invention.
3. Air leakage can be prevented since all module units are communicated and connected with flexible hoses H. Each module unit and the complete set of the air tool can be tested for checking air tightness and for preventing the leakage espically before assembling the elements into the housing, thereby providing a qualified air tool having higher efficiency and reliability.
4. For repair and maintenance, the two half shells can be dismantled easily and the damaged unit can be replaced with a new one, thereby keeping a well maintenance for the air tools.

The designation of "module" unit in this invention is thus defined because each part or element in the construction of the present invention can be tested, fitted or dismantled individually and independently in the form of a "module" unit for enhancing the flexibility of a factory manufacturing, inventory control, plant quality control and standardization and for facilitating mass production.

The present invention may be applied for all kinds of pneumatic tools as hereinafter described, but not limited in this invention.

Figure 4:
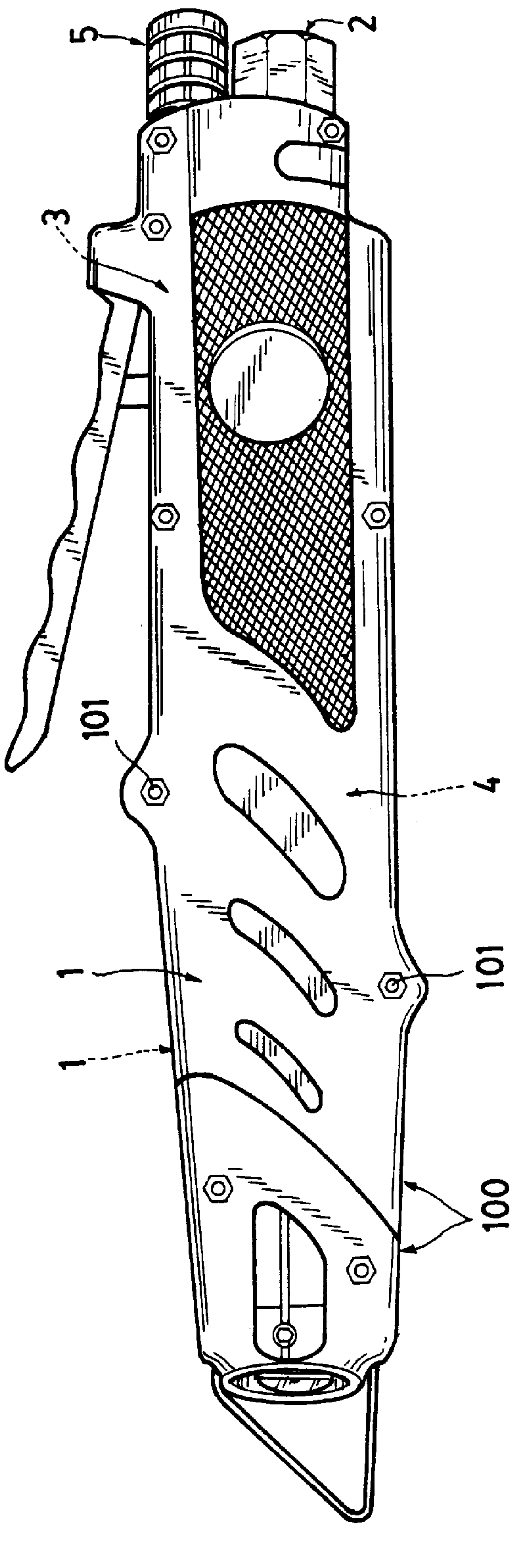
FIG. 4 shows an air saw of the present invention.
Figure 6:
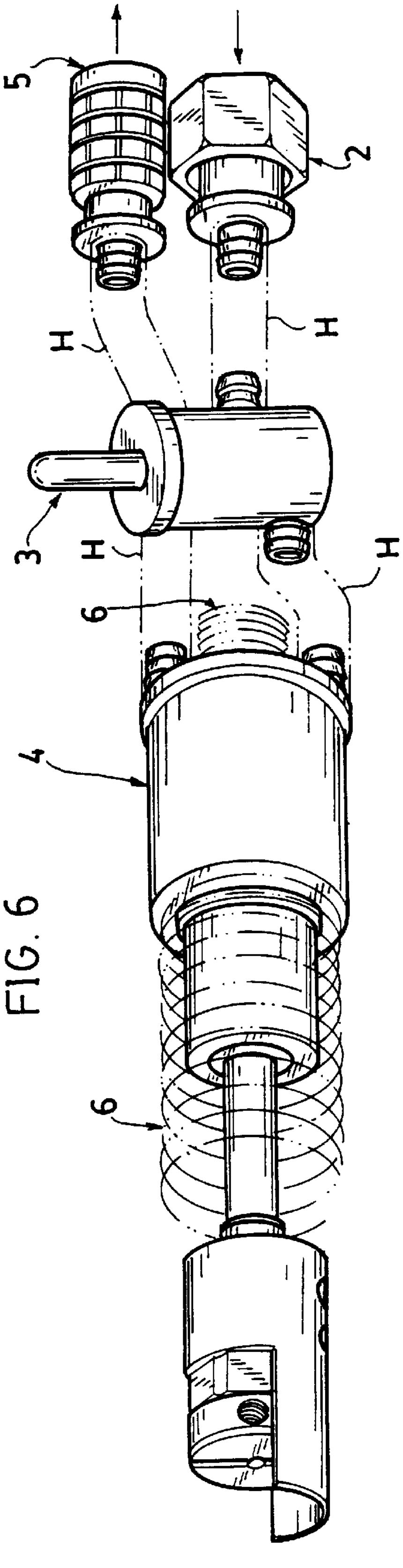
FIG. 6 shows the module units to be assembled into the housing of the air saw.
Figure 5:
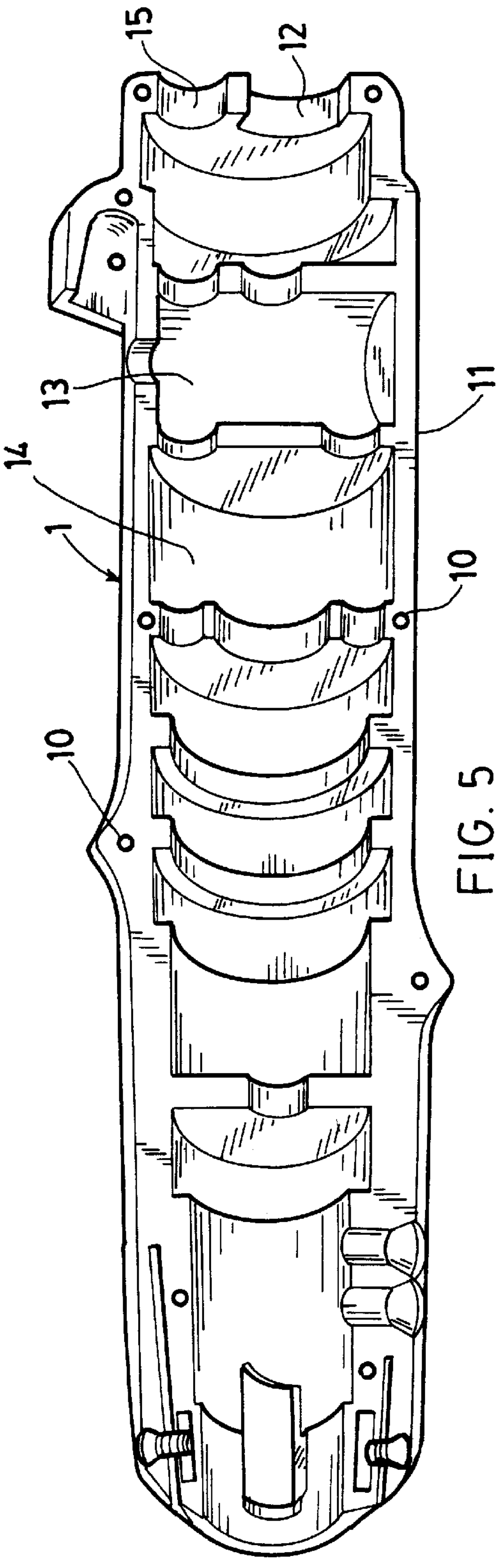
FIG. 5 shows a half shell of the housing of the air saw of FIG. 4.

As shown in FIGS. 4–6, an air saw is provided to have the module units generally linearly arranged in the shells 1 of linear shape. The operating or functioning module unit 4 is retained in the functioning cavity 14 in the shell 1 of the housing 100 as cushioned by a shock-absorbing unit 6 which may be damping springs as illustrated. Hoses H are provided to connect the relevant module units including the operating unit 4, the valve actuating unit 3, the air inlet unit 2 and the air outlet unit 5.

Figure 7:
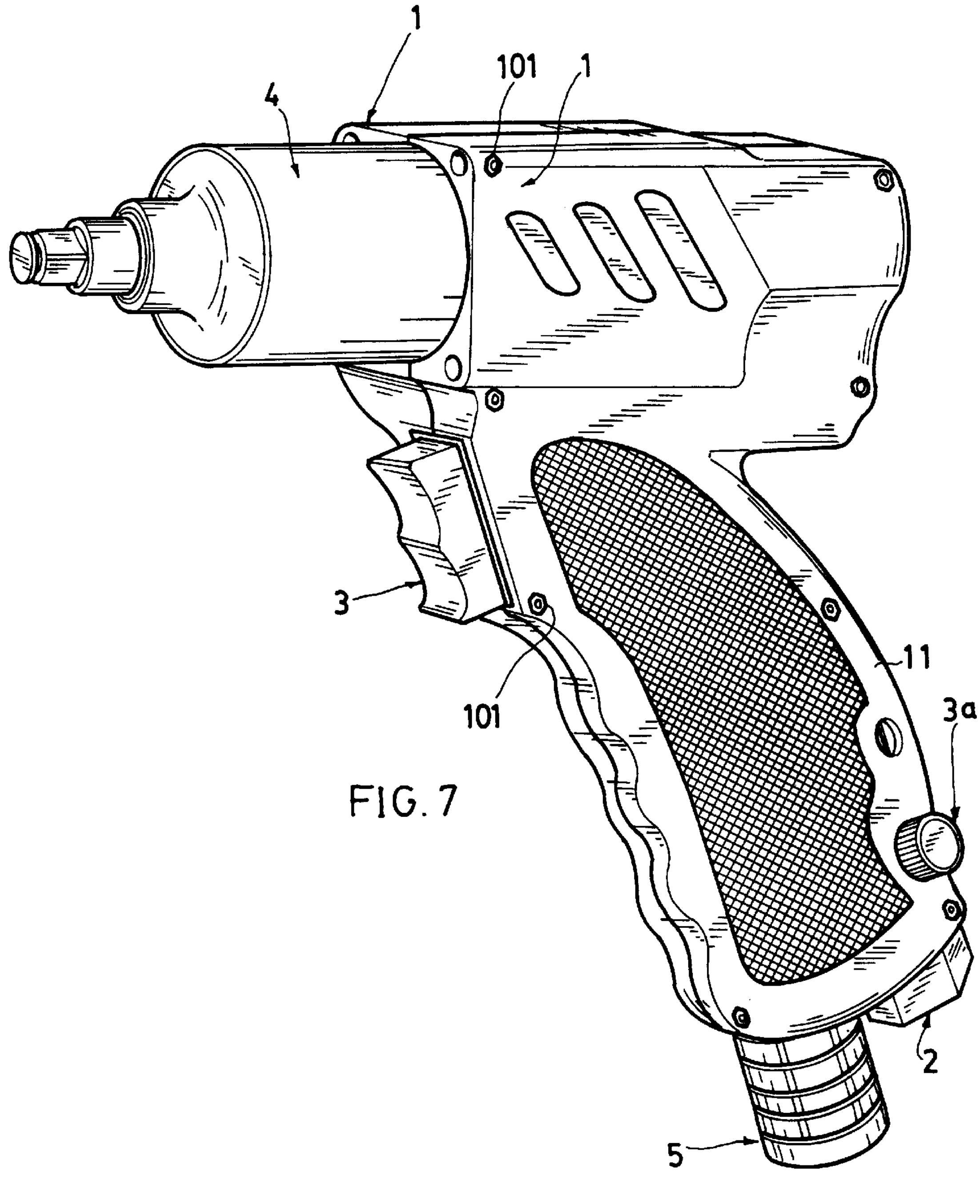
FIG. 7 is a perspective view of an air impact wrench of the present invention.
Figure 8:
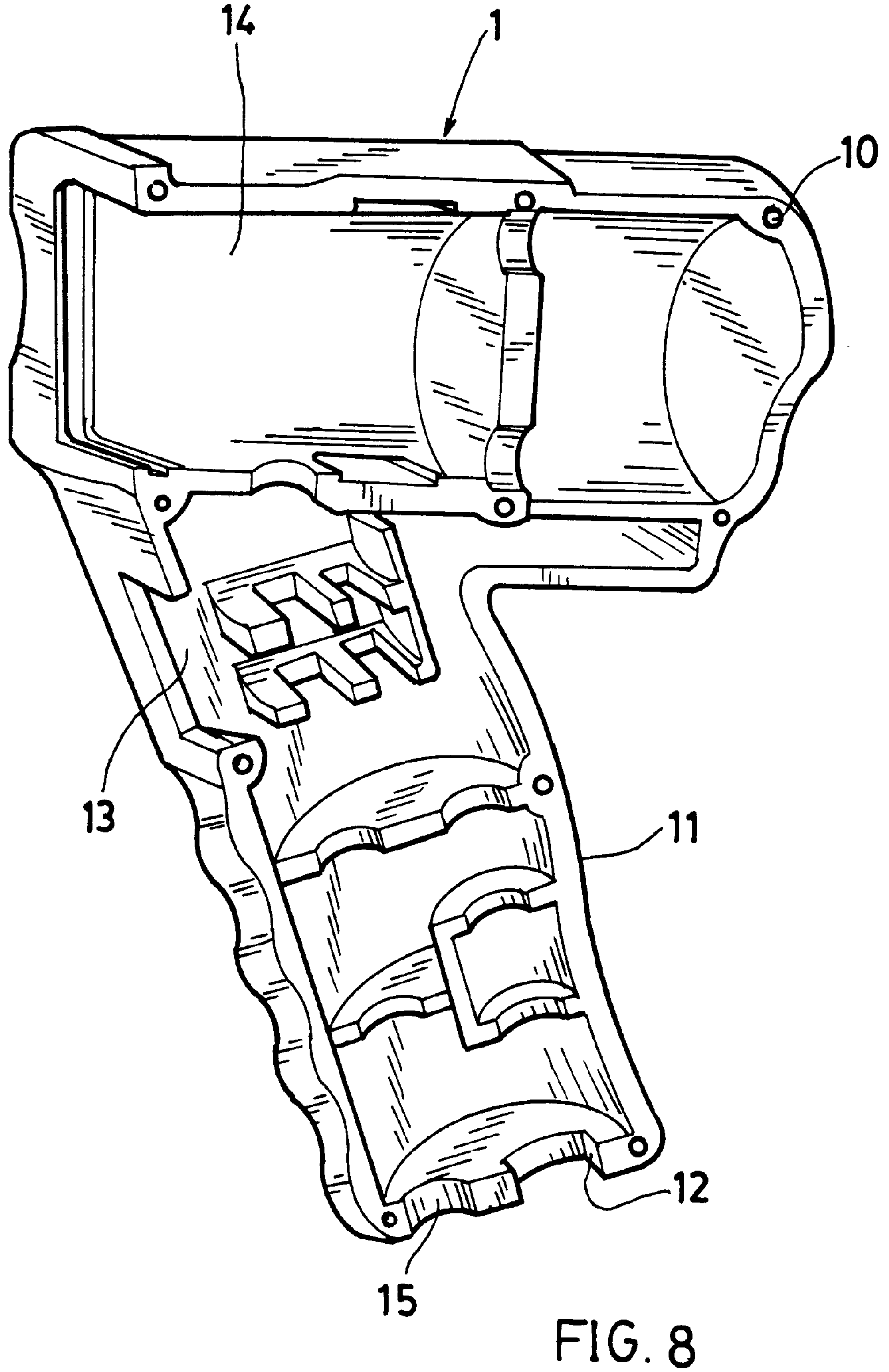
FIG. 8 shows a half shell of the housing of the air impact wrench as shown in FIG. 7.
Figure 9:
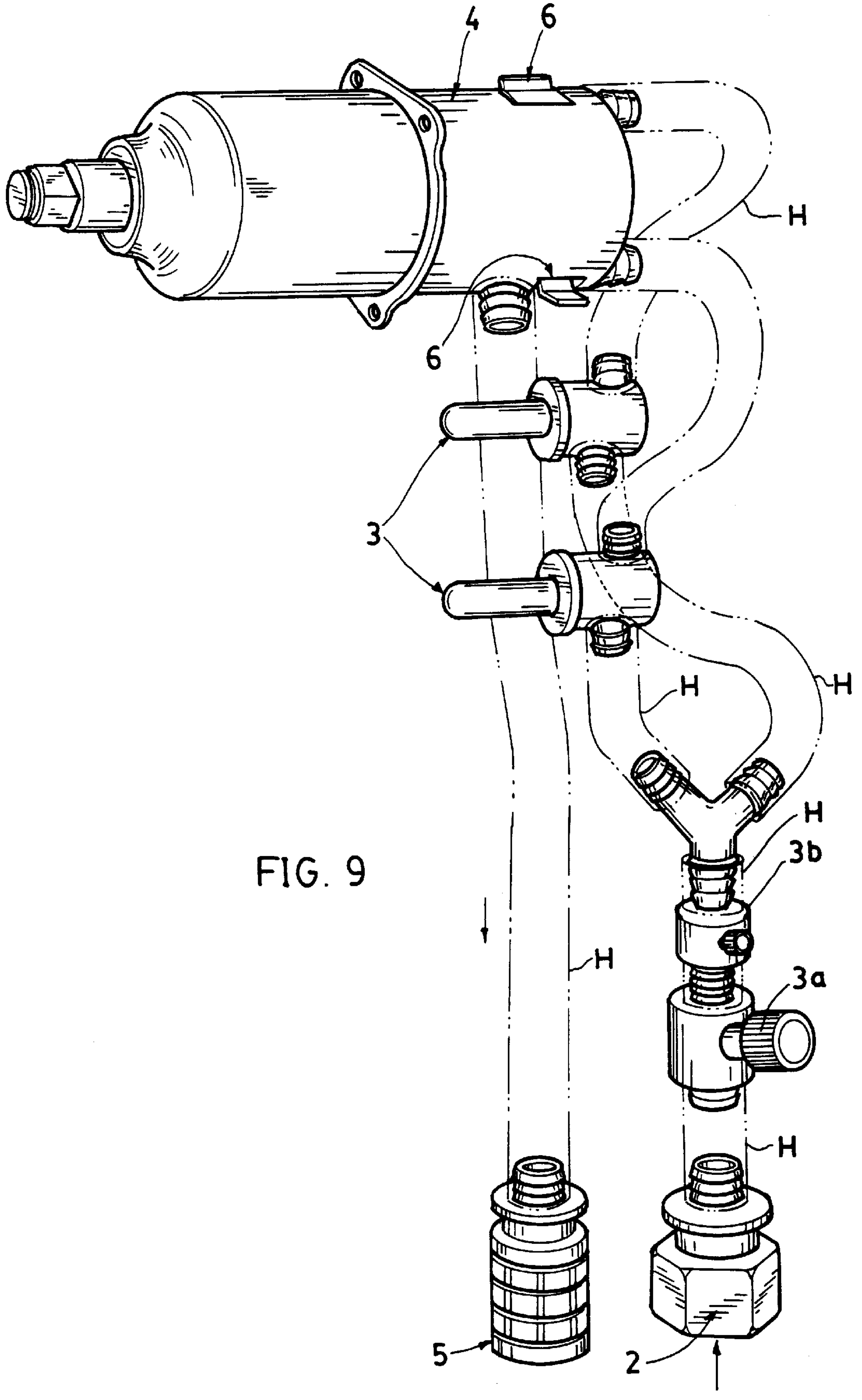
FIG. 9 shows the module units to be assembled into the housing of the air impact wrench.

As shown in FIGS. 7–9, an air impact wrench is provided in accordance with the present invention, including an air inlet unit 2 fitted in the cavity 12 in the shell 1, a valve actuating unit and control unit for forward or reversing rotation 3 fitted in the cavity 13, an operating or functioning unit 4 fitted in the functioning cavity 14, and the air outlet unit (muffler) 5 fitted in the cavity 15 in the shell 1. All units are connected with hoses H therebetween. Between the valve unit 3 and air inlet unit 2, a regulator **3*a* and a lubricator 3*b* may be provided in the hose H connected between the two units 3, 2**.

The shock-absorbing unit 6 is modified to be a plurality of damping devices fixed on the operating unit 4, each damping device cushioned between the operating or functioning unit 4 and the inside wall of the housing shells 1 for absorbing vibrational shock caused by the air tool when operated.

Figure 10:
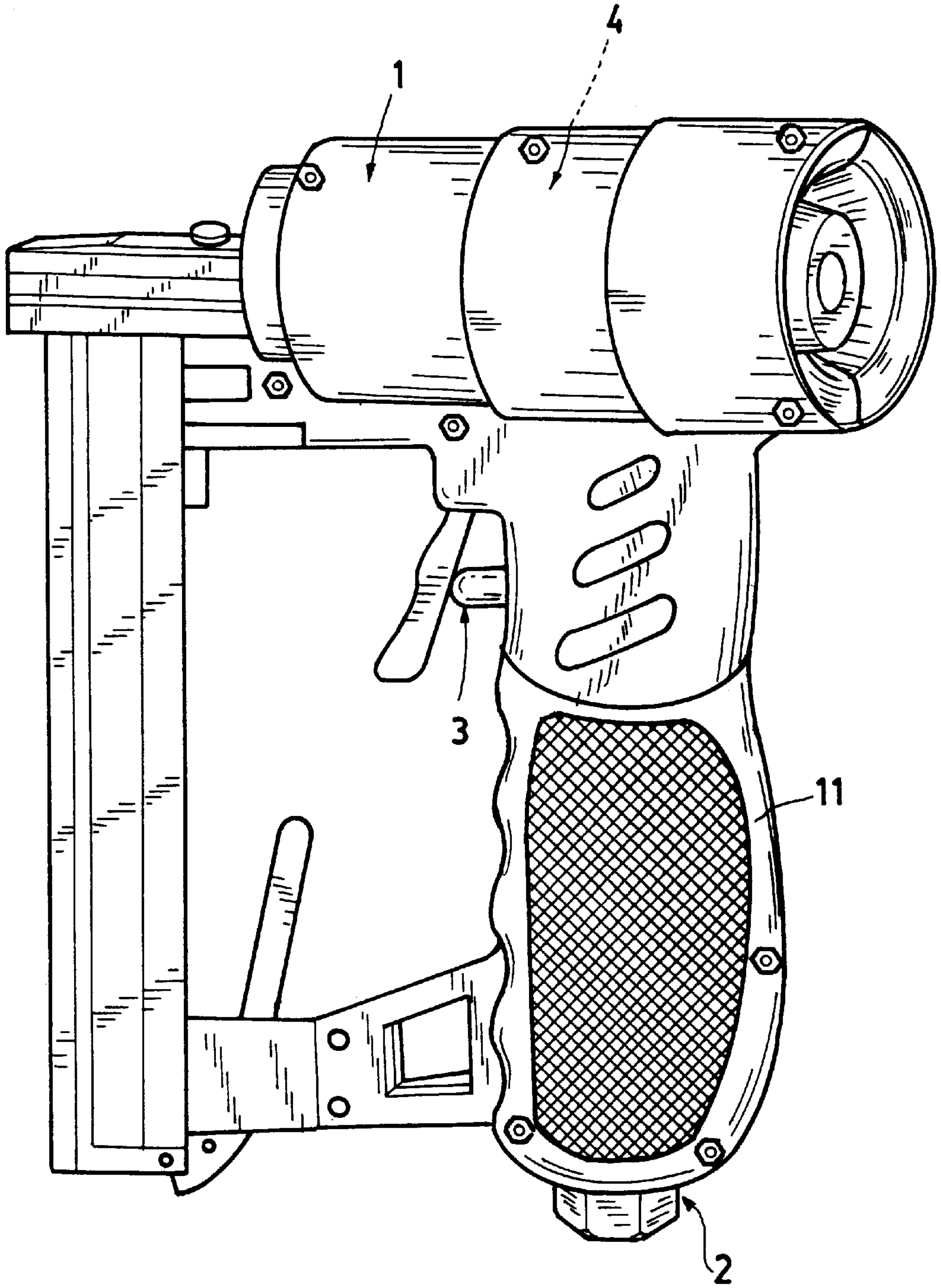
FIG. 10 shows an air staple gun of the present invention.
Figure 12:
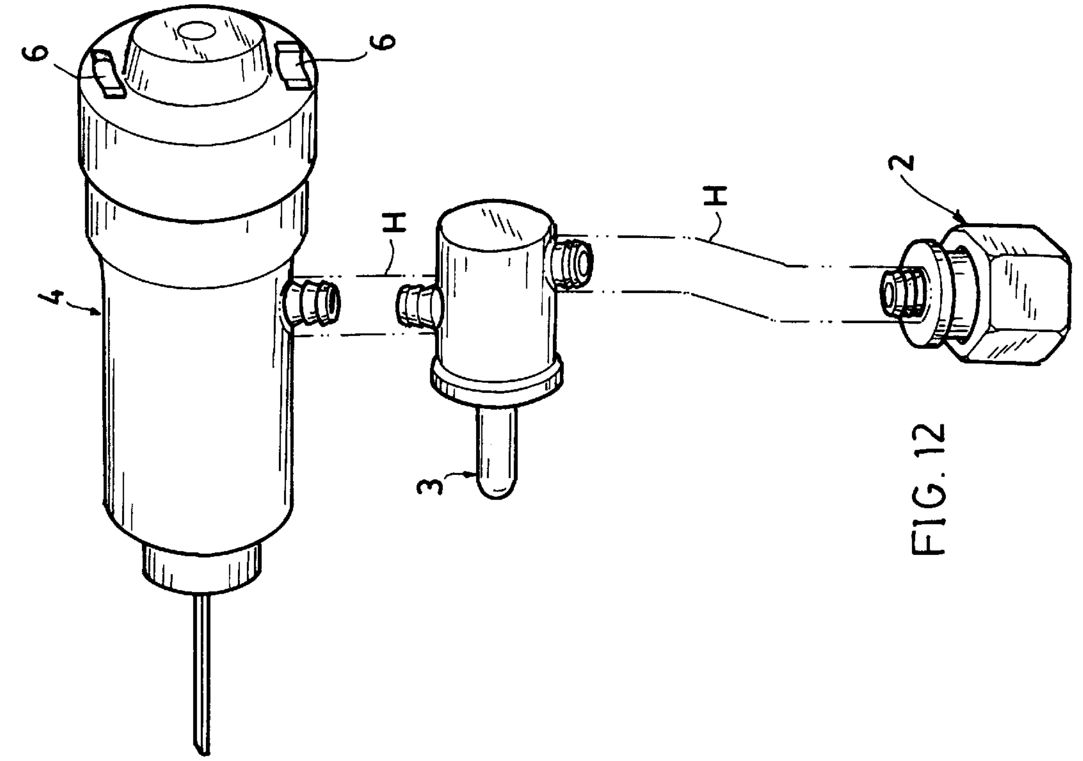
FIG. 12 shows the module units to be assembled into the housing of the air staple gun.
Figure 11:
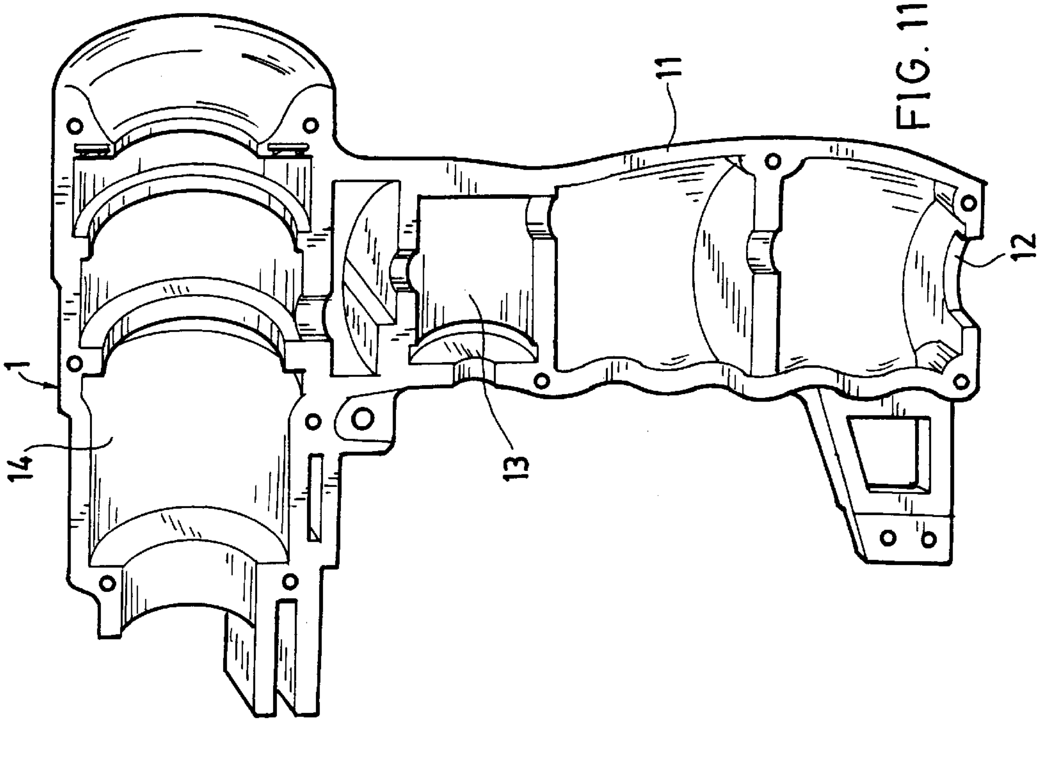
FIG. 11 shows a half shell of the housing of the air staple gun of FIG. 10.

As shown in FIGS. 10–12, an air staple gun is provided by fitting the air inlet unit 2 and the valve unit 3 in the grip 11 of the shell 1 and fitting the operating or functioning unit 4 in the functioning cavity 14 in the shell 11 having a plurality of damping devices 6 retained between the operating or functioning unit and the housing shells 1 for absorbing vibrational shock for preventing shock damage or injury to the operators.

Figure 13:
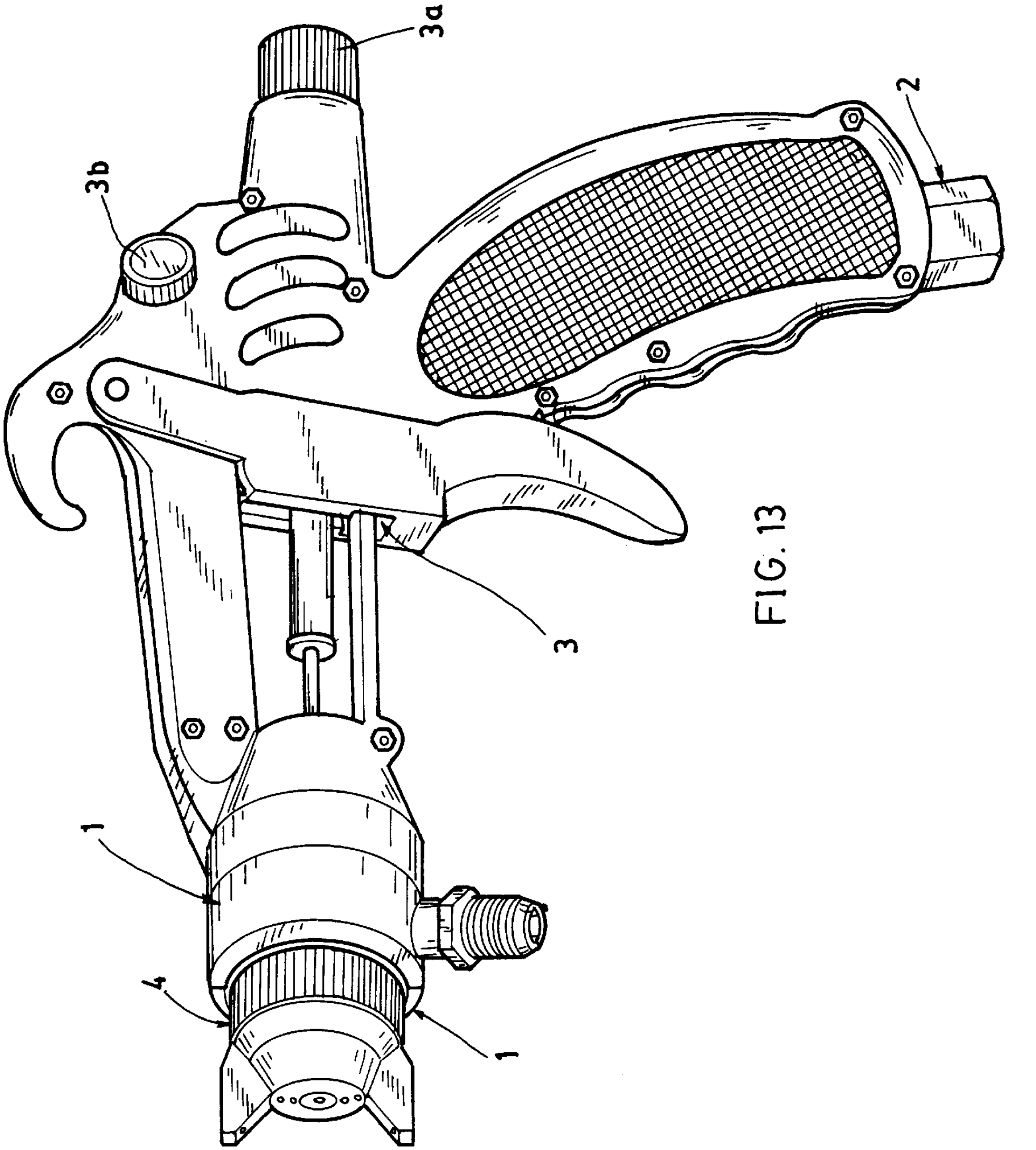
FIG. 13 shows an air spray gun of the present invention.
Figure 14:
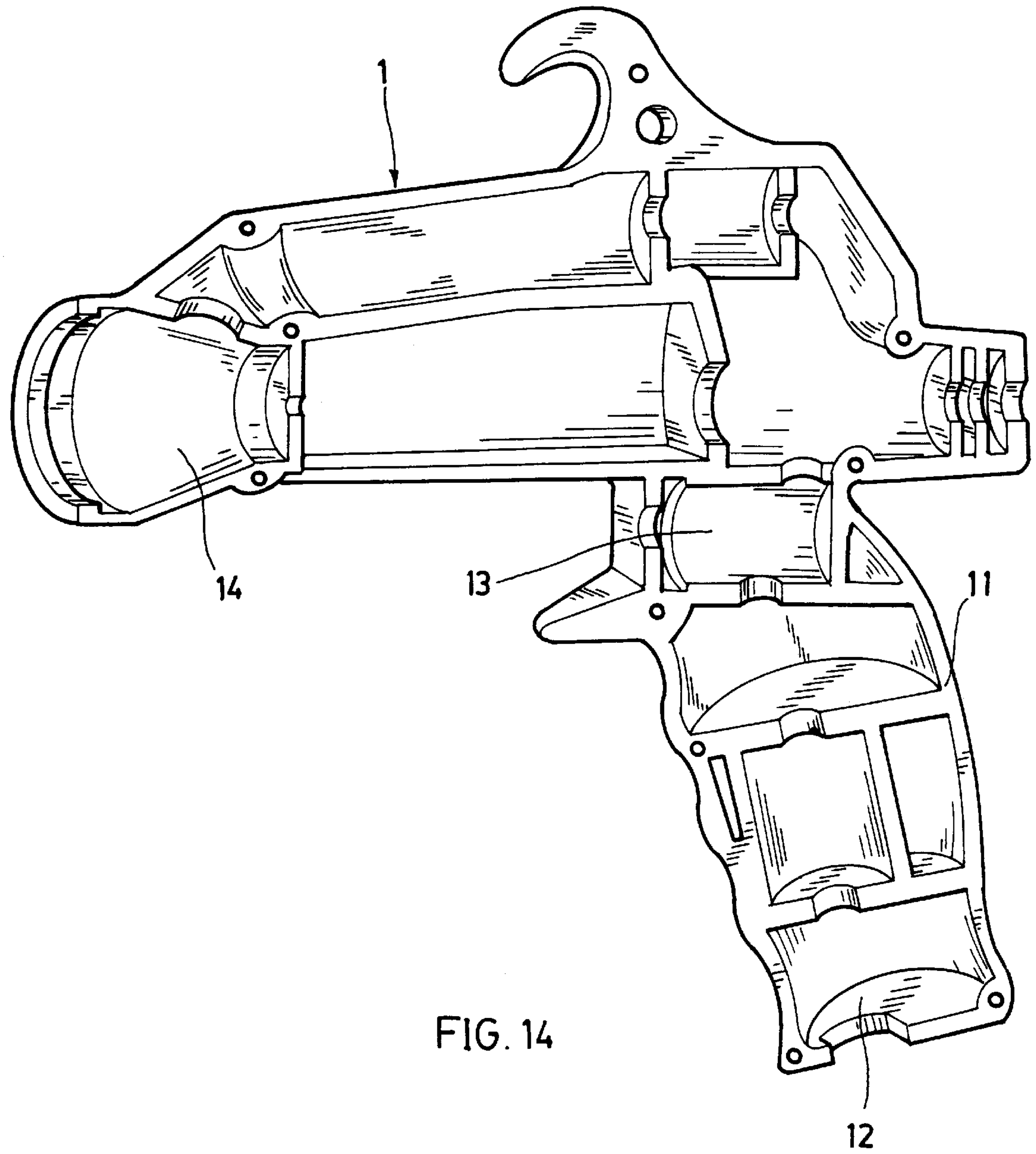
FIG. 14 shows a half shell of the housing of the air spray gun of FIG. 13.
Figure 15:
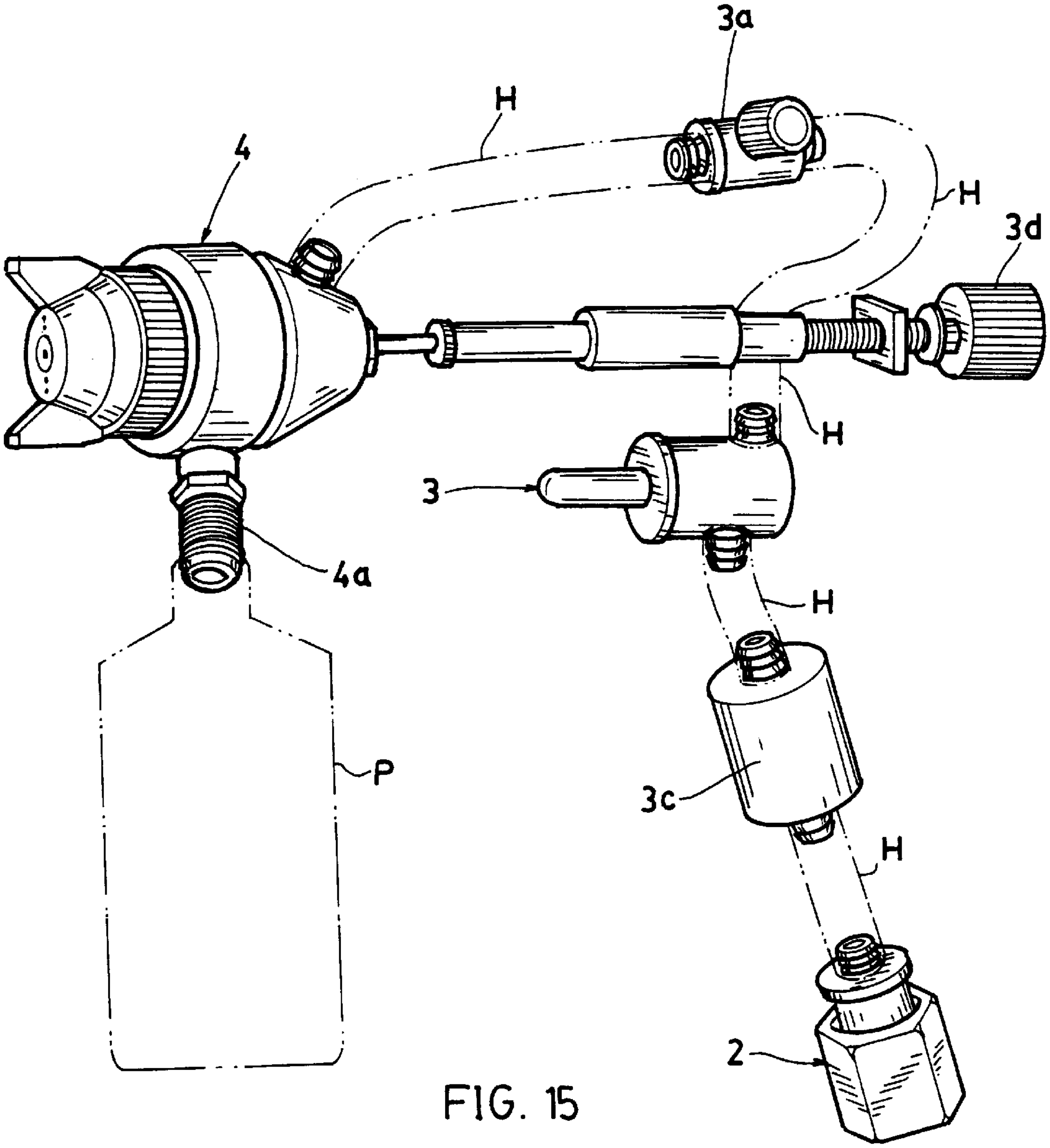
FIG. 15 shows the module units to be assembled into the housing of the air spray gun.
Figure 16:
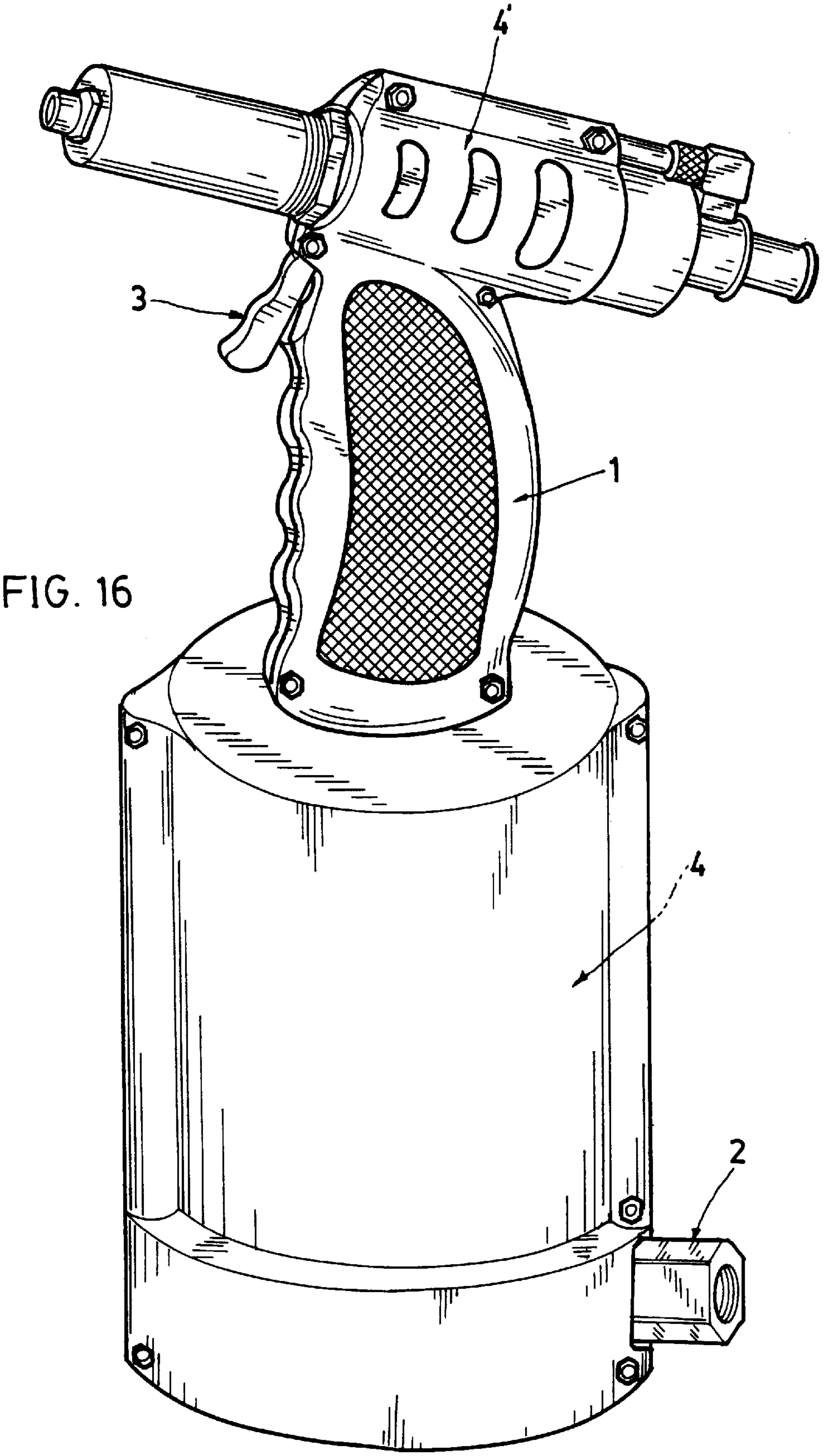
FIG. 16 shows an air hydraulic riveter in accordance with the present invention.
Figure 17:
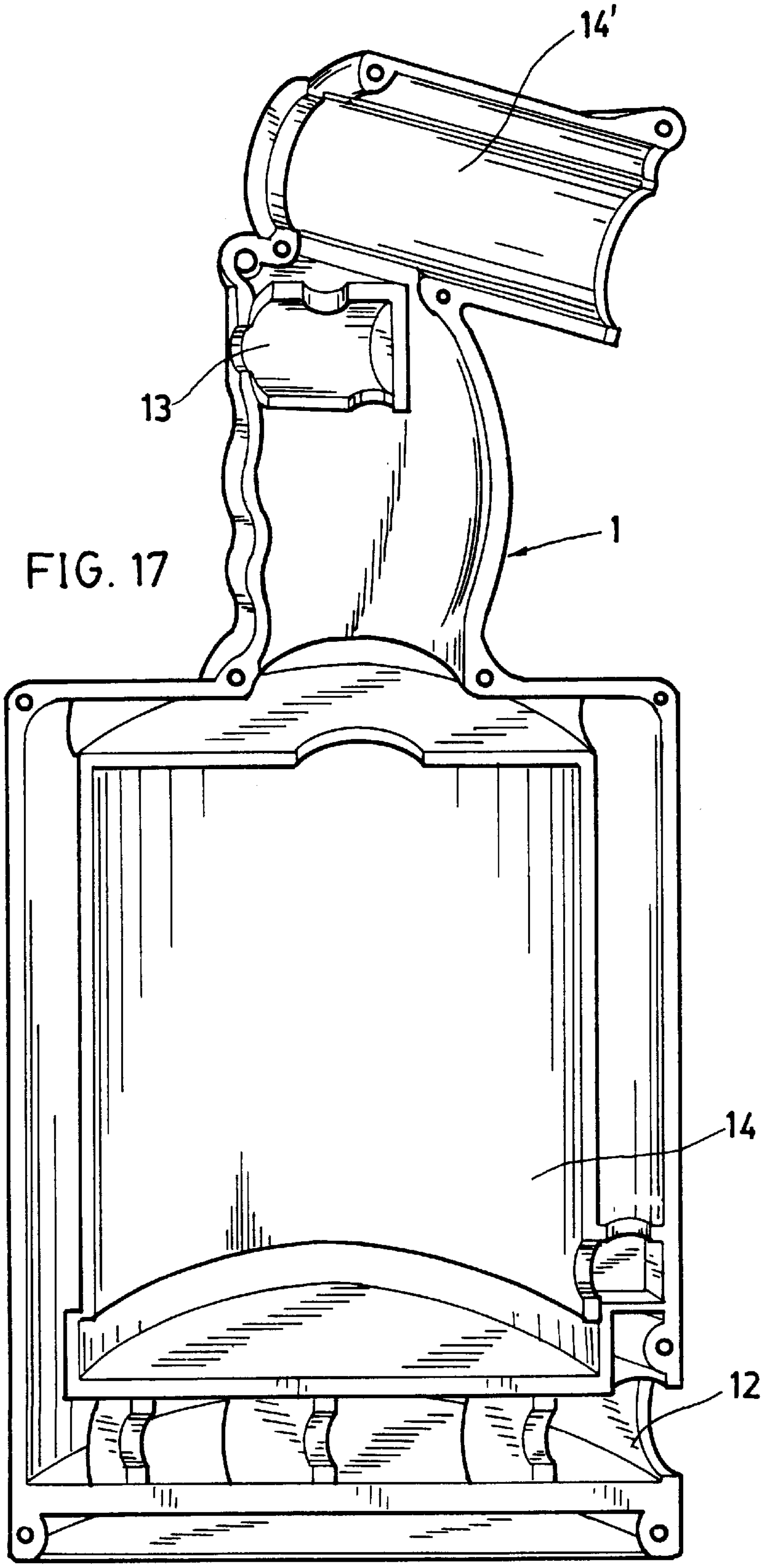
FIG. 17 shows a half shell of the housing of the air hydraulic riveter of FIG. 16.
Figure 18:
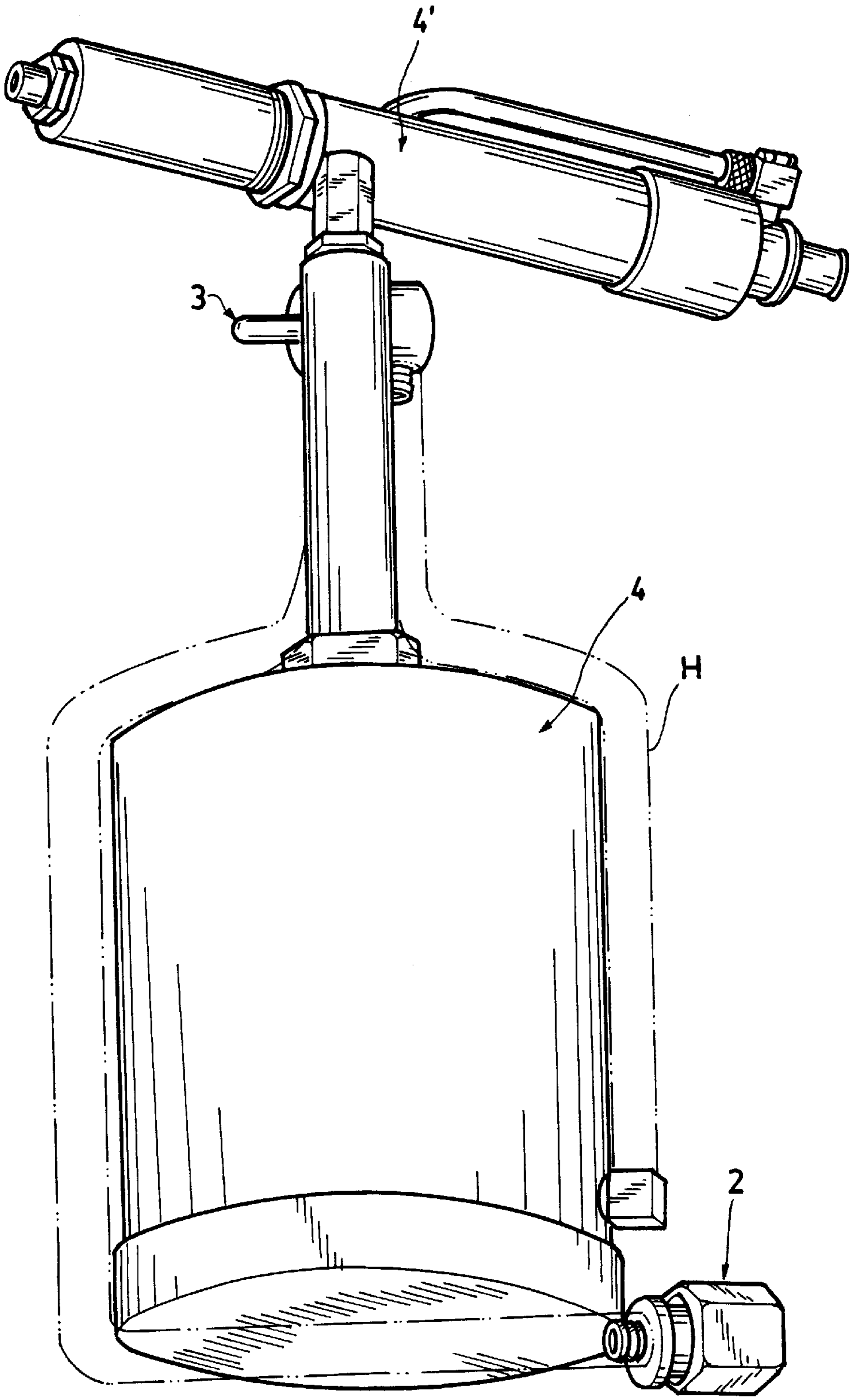
FIG. 18 shows the module units to be assembled into housing of the air hydraulic riveter of FIG. 16.
Figure 19:
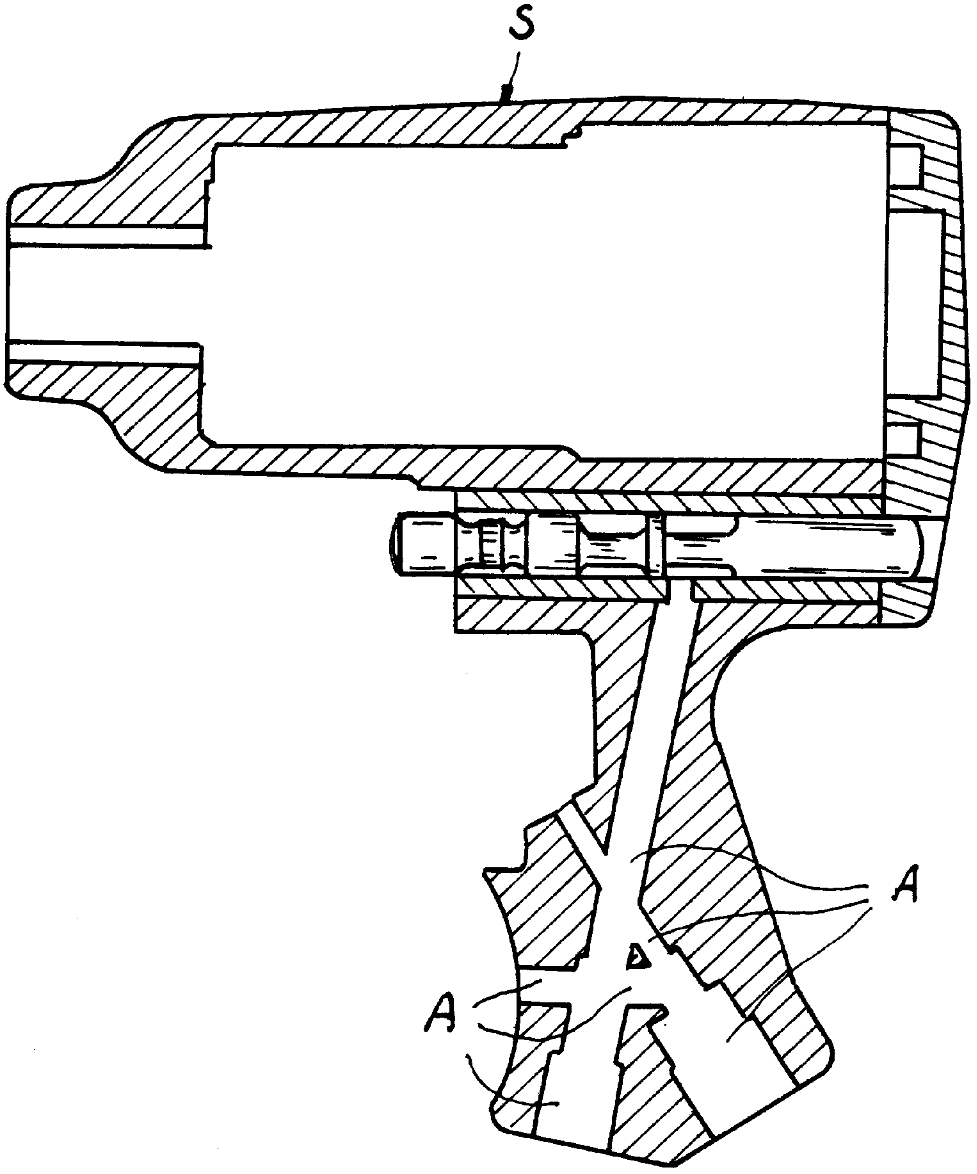
FIG. 19 PRIOR ART
FIG. 19 is a sectional drawing showing a housing of a conventional air tool.

As shown in FIGS. 13–15, an air spray gun is provided by fitting the air inlet unit 2, a filter **3*c*, and the valve unit 3 in the grip 11 of the housing shell 1 and by fitting the operating or functioning unit 4 into the functioning cavity 14 of the shell 1 having a suction tube 4*a* protruding downwardly into a paint cup or container P for sucking paint upwardly to be sprayed outwardly by the operating or functioning unit 4, a fluid (paint) control regulator 3*d* operatively adjusting the fluid (paint) flow rate in the operating or functioning unit 4 and an air regulator 3*a* provided in the hose H between the valve unit 3 and the operating or functioning unit 4** for adjusting the air pressure or air flow rate.

As shown in FIGS. 16–19, an air hydraulic riveter is provided, in which the operating or functioning module unit 4 is an air functioning unit for controllably supplying air into the air cylinder through which the air is directed into a hydraulic functioning unit 4' for riveting operation. So, the air functioning unit 4 transfers and converts a rated air power to a higher hydraulic power for driving the hydraulic functioning unit 4' for operating the tool.

The module units as disclosed in the present invention may be standardized in conformity with the related specifications as required for mass production with lower cost.

The present invention may be further modified without departing from the spirit and scope of this invention.

What is claimed is:

1. A portable pneumatic tool comprising:

a housing composed of a plurality of shells combinable for forming said housing;

an air inlet module unit fitted in an air inlet cavity recessed in said shell for leading air into the housing;

a valve actuating module unit fitted in a valve cavity recessed in the shell for controlling an air supply from the air inlet module unit, having a first flexible hose connected between said valve actuating module unit and said air inlet module unit;

a functioning module unit secured in a functioning cavity formed in the shell and connected with said valve actuating module unit by a second flexible hose therebetween; and a shock-absorbing unit retained between said functioning module unit and an inside wall of said functioning cavity of said shell for absorbing vibrational shock caused by operating the functioning module unit of the pneumatic tool; with said shells combined and fastened to fit the module units therein; and said shock-absorbing unit selected from the group consisting of a damping spring and a shock absorbable medium including elastomer.

2. A portable pneumatic tool according to claim 1, wherein said functioning module unit is further connected to an air outlet module unit by a third flexible hose connected therebetween for discharging exhaust air outwardly; with said air outlet module unit fixed in an air outlet cavity recessed in said shell.

3. A portable pneumatic tool according to claim 1, wherein each said hose has a regulator and a lubricator mounted therein respectively for adjusting air flow rate and for lubrication.

4. A portable pneumatic tool according to claim 1, wherein said functioning module unit is an air functioning module unit and is further connected with a hydraulic functioning unit having a tool secured to said hydraulic functioning unit; said air functioning module unit operatively transferring and converting a rated air power to a higher hydraulic power for driving said hydraulic functioning unit for operating the tool.

* * * * *